July 29, 1969    S. F. RADTKE    3,458,355

STORAGE BATTERY GRID AND METHOD FOR MAKING GRID

Filed Feb. 3, 1967

INVENTOR.
SCHRADE F. RADTKE
BY
his ATTORNEYS

United States Patent Office 3,458,355
Patented July 29, 1969

3,458,355
STORAGE BATTERY GRID AND METHOD FOR MAKING GRID
Schrade F. Radtke, New Canaan, Conn., assignor to International Lead Zinc Research Organization, Inc., New York, N.Y., a corporation of New York
Filed Feb. 3, 1967, Ser. No. 613,872
Int. Cl. H01m 35/08
U.S. Cl. 136—38                                     4 Claims

ABSTRACT OF THE DISCLOSURE

This specification discloses corrosion resistant storage battery grids characterized by interstices having rounded rather than angular ends.

---

This invention relates to electric storage batteries and to the construction of the grids employed in storage batteries to support the active material of the battery and conduct the electric current generated by the cell.

The invention is particularly concerned with storage battery grids which are known as expanded metal grids. As is well known, there are a number of methods for manufacturing grids from sheets of metal. In general, these methods fall into two groups. In one method, a sheet which is to be expanded is provided with a series of parallel and overlapping slits. The sheet is then stretched or expanded in the direction perpendicular to the direction of the slits, for example, by forceably pulling the sheet by means of rollers so that the slits are widened out into gaping diamond-shaped openings. The width of the overall sheet is considerably increased and the length of the sheet, i.e., the dimension which is at right angles to the direction in which the sheet is expanded, becomes smaller.

In a second method of making metal grids, diamond shaped perforations are provided by a method in which a metallic sheet is fed into a press which has tools adapted to bend the engaged portion of the sheet through substantially a right angle with respect to the main sheet, and the material slitted, the resulting strands being punched and stretched in one operation, so as to be shaped into the roughly diamond shaped mesh which characterizes expanded metal. This method does not cause any change in the overall dimensions of the sheet.

The term "expanded metal" as used herein is intended to include grids prepared by both the conventional expansion method and the punch-bend method.

One of the disadvantages heretofore encountered in storage batteries employing expanded metal grids is that the grids have been found to be subject to considerable corrosion at the narrow ends of the diamond shaped openings. Such grids have been found to be subject to the development differential aeration cells or concentration cells which are generated at the acute angles of the perforations and such internal cells cause excessive corrosion deterioration, and subsequent failure of the battery grid.

In making expanded metal grids by the standard procedure, the strips bounding the interstices lie in at least two different planes which are angularly disposed to one another. In order to flatten such expanded strips it may be necessary to press or roll the projecting portions and when this is done the sheet is likely to fracture or crack at the points of bending located at the narrow ends of the open area. It is believed that differential aeration cells tend to develop at the narrow ends of the slits and in particular in the small crevices and cracks which develop at the narrow ends of the slits either during expansion of the grids or during any subsequent rolling or deformation of the expanded sheet.

The principal object of this invention is to provide battery grids of the expanded metal type which are free from corrosion caused by differential aeration cells.

Another object of the invention is to provide battery grids characterized by extended service life.

It has been found that the existence of differential aeration cells at the narrow ends of the diamond shaped perforations in an expanded metal battery grid can be avoided by providing grids which have roughly diamond shaped perforations but do not have sharp angles at the ends thereof. Such grids can be constructed from slitted sheets having small round or elliptical holes at each end of the slits. Upon expansion, the slits are opened but the acute angles normally formed at the ends of the diamond shaped apertures are eliminated and replaced by arcuate ends. The presence of such arcuate ends prevents the development of crevice corrosion and provides a grid which is not subject to internal corrosion caused by differential aeration cells. By slitting and providing a small round hole at the end of the slit, the formation of a sharply tapering grid aperture is eliminated. When the grid is expanded and the slit opened there is formed a substantial void or perforation which does not contain acute angles and, consequently, is free of the sites at which differential aeration cells generally develop. The term "round" as used in reference to the holes at the ends of the slits is intended to include openings which are defined by a curve and refers to circular and elliptical holes as well as to any shape which will provide arcuate ends for the interstices after expansion.

Expanded metal grids according to this invention are illustrated in the accompanying drawing, in which.

Figure 1:
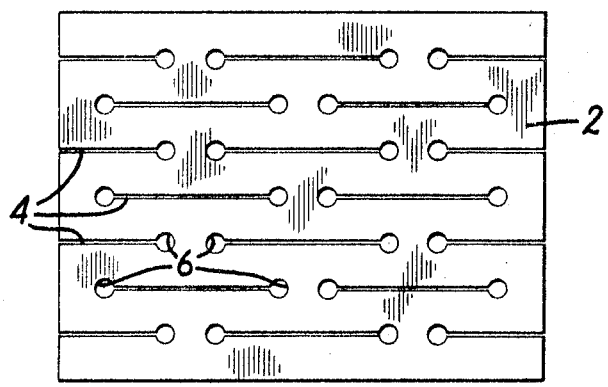
FIGURE 1 is a plan view of a punched and slitted metal sheet.
Figure 2:
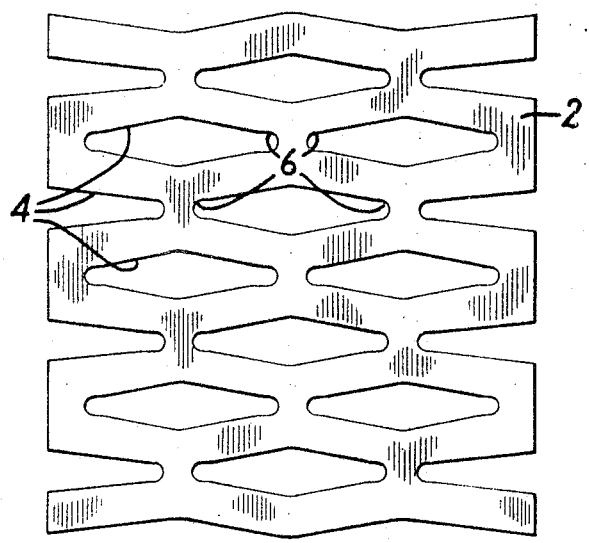
FIGURE 2 is a plan view of an expanded sheet prepared from a punched and slitted sheet, as shown in FIGURE 1.

More particularly, in FIGURE 1, there is shown a suitably punched and slitted metal sheet 2 having a series of slits 4 and at each end of each slit a round punched hole 6. Such punched and slitted sheets can be expanded in any conventional manner to provide a battery grid, such as is shown in FIGURE 2, in which there is shown an expanded metal grid 2 which is provided with roughly diamond shaped interstices 4 having arcuate ends 6. It can be seen that the diamond shaped openings or pockets of the expanded grid do not have acute angles at the ends thereof.

In the construction of expanded metal grids in accordance with this invention, it is preferred to punch the sheet at the ends of the slits by means of suitably shaped punches in order to provide round or elliptical holes which lie at the junctures of all the bars or strips which bound the interstices of the pockets. These round holes located at the junction points provide narrowed sections which provide points of bending which are free from stresses and crevices caused either by the expansion of the sheet or the rolling and flattening of the sheet. It is preferred that the holes be circular, i.e., of constant curvature, and that the radius of curvature be no less than about one-half thickness of the sheet. For example, when the punched holes are substantially complete circles, the diameter thereof should be no less than about the thickness of the sheet. When the curvature of the hole is not constant, the radius of curvature at the point of maximum curvature should be no less than about one-half the thickness of the sheet. Accordingly, one can punch holes of increasing size, depending upon the thickness of the sheet from which the grid will be formed.

It is generally preferred that the holes be of the maximum size which is consistent with the thickness of the sheet and the geometry of the grid. After expansion, the spacing between the corners of the roughly diamond shaped perforations should be no less than the diameter of the hole punched at the end of each slit. The efficiency of the holes in minimizing the crevice cracking will increase as the size of the hole increases.

Preferably, the slits are close together and are in parallel rows; the slits of each row being parallel to one another, and slits in alternate rows overlapping the spaces between the slits in the adjacent rows. Such slitted sheet can be prepared by a process in which a sheet of metal is passed between pairs of slitting rollers provided with slitting teeth. The slitted sheet is then pulled perpendicular to the length of the slits so that they open up ino roughly diamond shaped openings which characterize expanded metal sheets.

After the metal sheet has been slitted and properly expanded the active material is pressed into the meshes of the expanded metal sheet and is firmly held there by virtue of the well known pocket-like characteristics of the angular diamond shaped interstices which are provided by the expanding process or by the special punching and bending operations which are employed to provide a punched grid having retaining pockets to contain the active material.

Expanded metal battery grids can be constructed of any suitable metal or alloy, a number of which are well known to the battery industry. For example, grids for lead-acid cells can be made of lead or various lead alloys, such as lead-antimony alloys. Other suitable construction materials include dispersion strengthened lead and lead alloys. Dispersion strengthened metals can be provided by dispersing a finely divided inert phase throughout a matrix of lead or lead alloy. The low solubility of many metals, oxides, and intermetallic compounds in lead and lead alloys, provides a wide variety of possible dispersants.

What is claimed is:

1. A battery grid including a sheet of expanded metal and active material contained within the interstices of the grid, said interstices being substantially diamond shaped and having (1) arcuate ends transversely of the direction of the expansion, and (2) a rounded oblique angle at the ends longitudinally of the direction of expansion.

2. The storage battery grid of claim 1 wherein the transverse ends are elliptical.

3. The battery grid of claim 1 wherein the radius of curvature of the arcuate transverse ends is no less than about one-half the thickness of the sheet.

4. A method for making an expanded battery grid which comprises forming a pattern of slits in a sheet of metal, drilling round holes at the ends of the slits, and thereafter expanding said sheet to form said grid having substantially diamond shaped interstices in such manner that the interstices have (1) arcuate ends transversely of the direction of the expansion, (2) a rounded oblique angle at the ends longitudinally of the direction of expansion, and filling said interstices with active material.

References Cited

UNITED STATES PATENTS

| 2,066,663 | 1/1937 | Zachlin | 136—38.1 |
| 2,503,970 | 4/1950 | Rupp | 136—38 |
| 2,716,146 | 8/1955 | Raney | 136—38 |
| 3,310,438 | 3/1967 | Huffman et al. | 136—36 |

WINSTON A. DOUGLAS, Primary Examiner

C.F. LE FEVOUR, Assistant Examiner